United States Patent [19]
Robinson et al.

[11] 3,991,868
[45] Nov. 16, 1976

[54] METHOD AND APPARATUS FOR PRINTING SEGMENTED CHARACTERS

[75] Inventors: Prentice I. Robinson, Pelham; Paul A. Lavoie, Manchester, both of N.H.

[73] Assignee: Centronics Data Computer Corporation, Hudson, N.H.

[22] Filed: Mar. 11, 1975

[21] Appl. No.: 557,276

[52] U.S. Cl. ............................ 197/1 R; 101/93.05; 178/30; 340/324 AD
[51] Int. Cl.² ........................................... B41J 3/04
[58] Field of Search ............ 197/1 R; 178/15, 23 R, 178/30; 340/324 A, 324 AD, 336, 172.5; 101/93.05

[56] References Cited
UNITED STATES PATENTS

| | | | |
|---|---|---|---|
| 3,678,497 | 7/1972 | Watson et al. | 340/324 A |
| 3,703,949 | 11/1972 | Howard et al. | 197/1 R |
| 3,740,743 | 6/1973 | Baron | 178/30 X |
| 3,878,536 | 4/1975 | Gilliam | 178/30 X |
| 3,893,100 | 7/1975 | Stein | 178/30 X |
| 3,893,558 | 7/1975 | Fulton et al. | 197/1 R |
| 3,896,428 | 7/1975 | Williams | 178/30 X |

*Primary Examiner*—Ralph T. Rader

[57] ABSTRACT

A printer of the dot matrix type for printing, single, double and triple sized characters. Normal sized characters are printed in the conventional fashion. Double and triple sized characters are printed through a segmented technique in which segments of the double and triple sized characters are stored within readable memories (ROMS). For double sized characters which occupy two adjacent character lines, the segmented patterns for the upper portions of the characters are printed along the first normal sized character line. The lower half of the double sized characters is printed on the next adjacent character line by selection of the appropriate segmented patterns. Triple sized characters are printed in a similar manner, utilizing three lines of conventional sized characters. The same technique may be employed to create other graphic patterns of 1 to N lines, where N is a real integer equal to or greater than 2. The technique permits the utilization of either unidirectional or bidirectional printers.

13 Claims, 18 Drawing Figures

DCW TIMING FOR SEGMENTED PATTERN

TIMING DIAGRAM SEGMENTED CHAR.

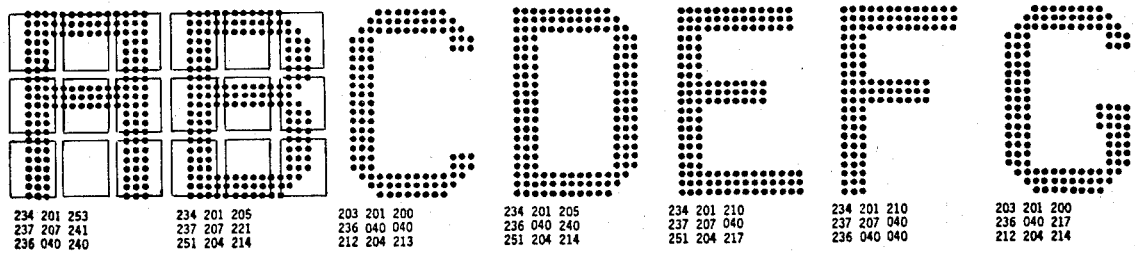
FIG. 2b
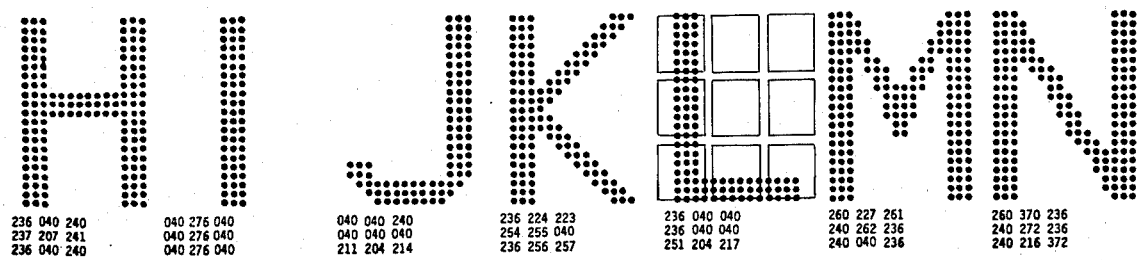
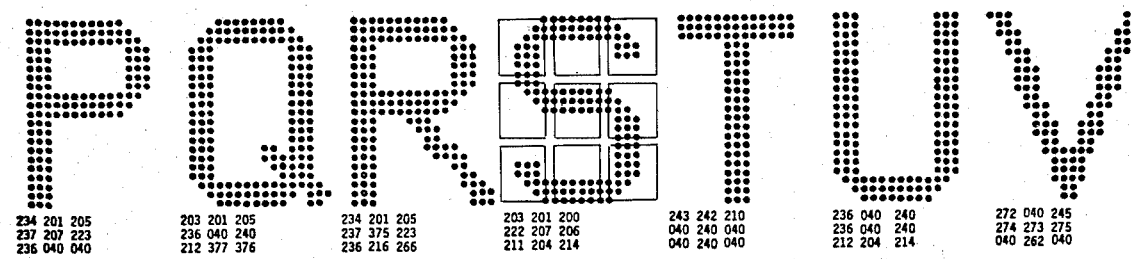
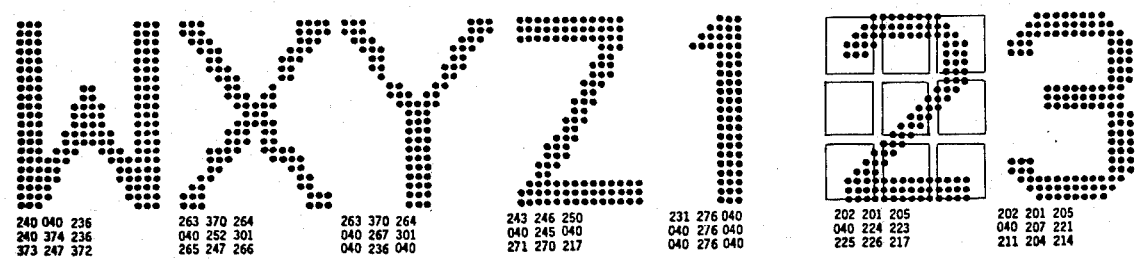
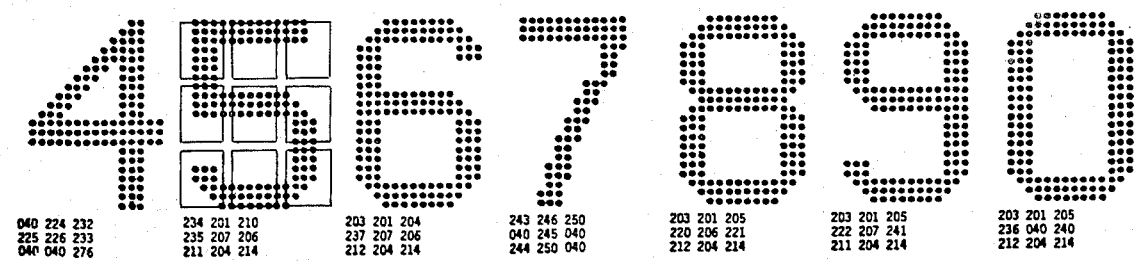

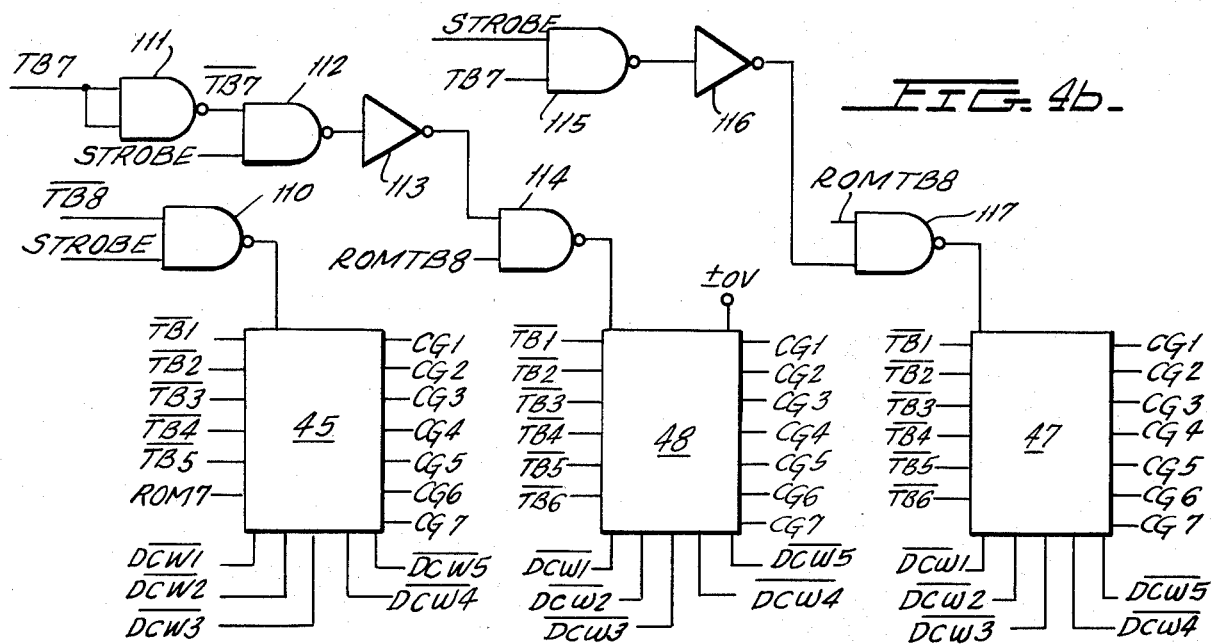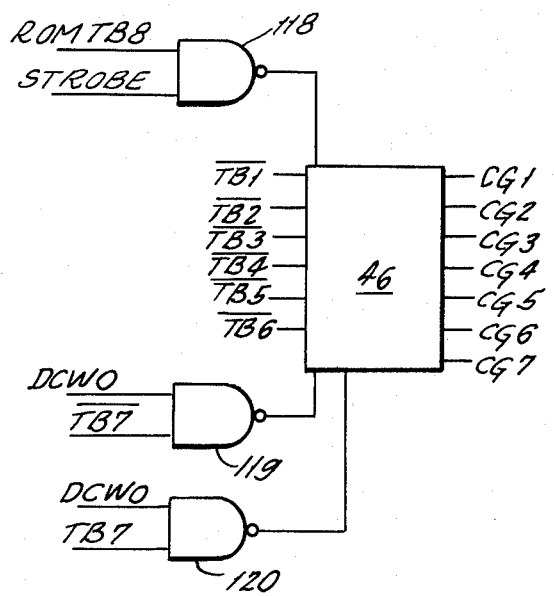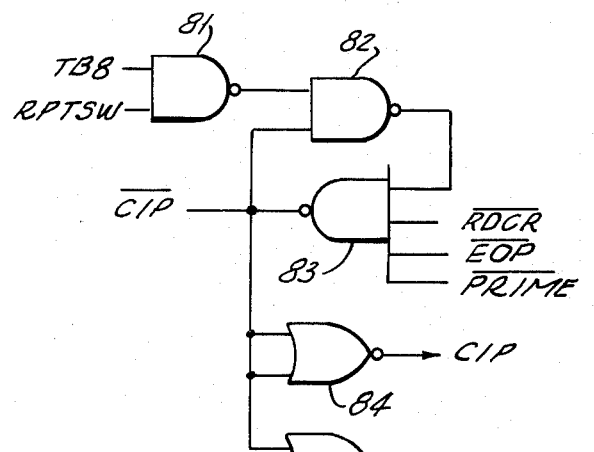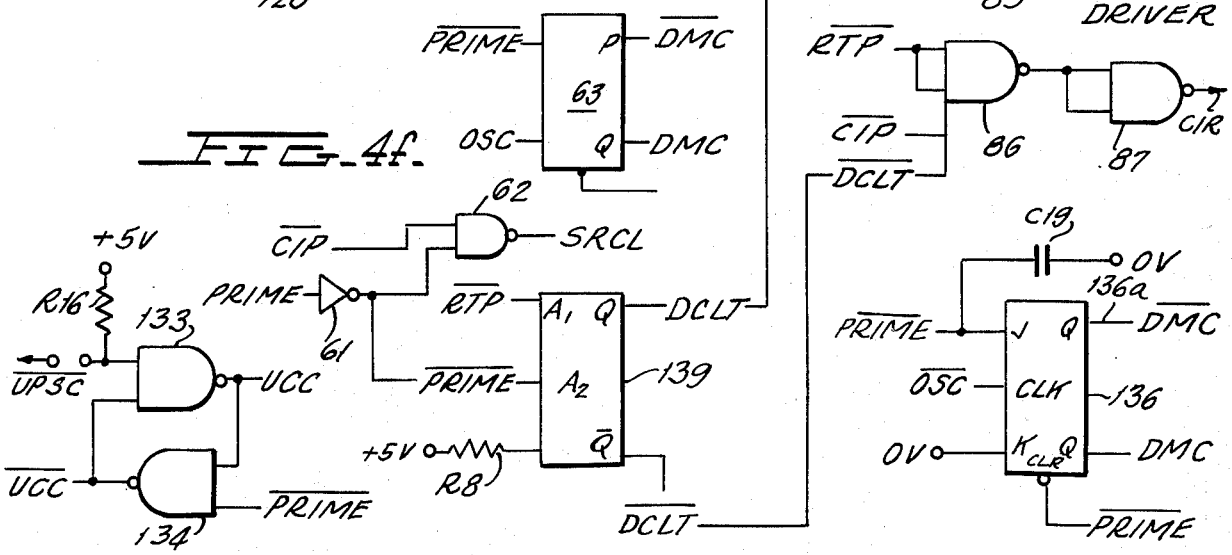

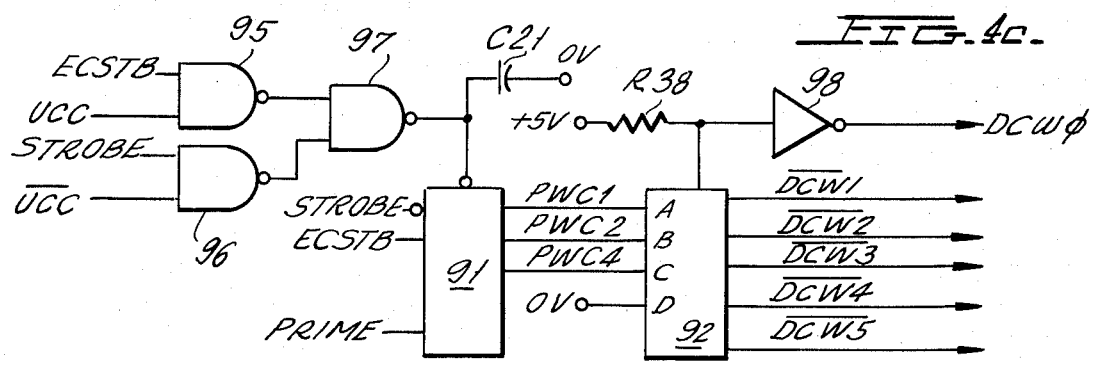
FIG. 4c.
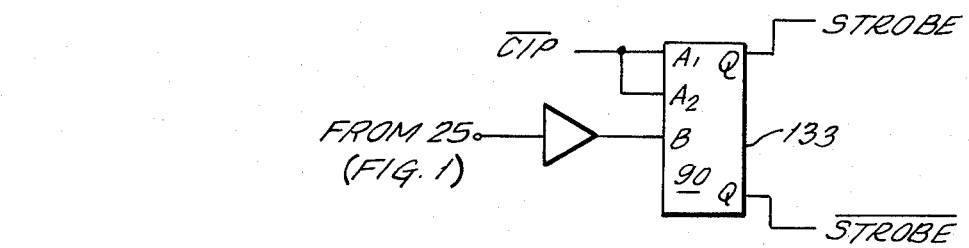
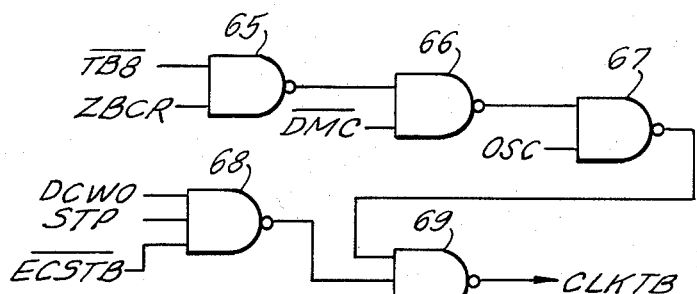
FIG. 4d.
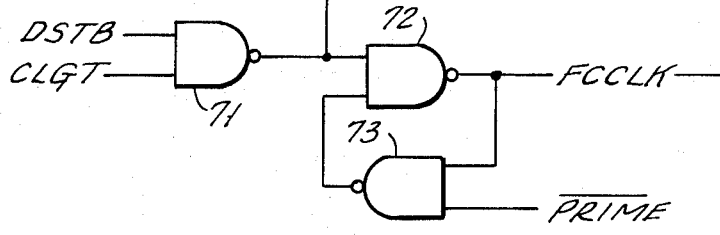
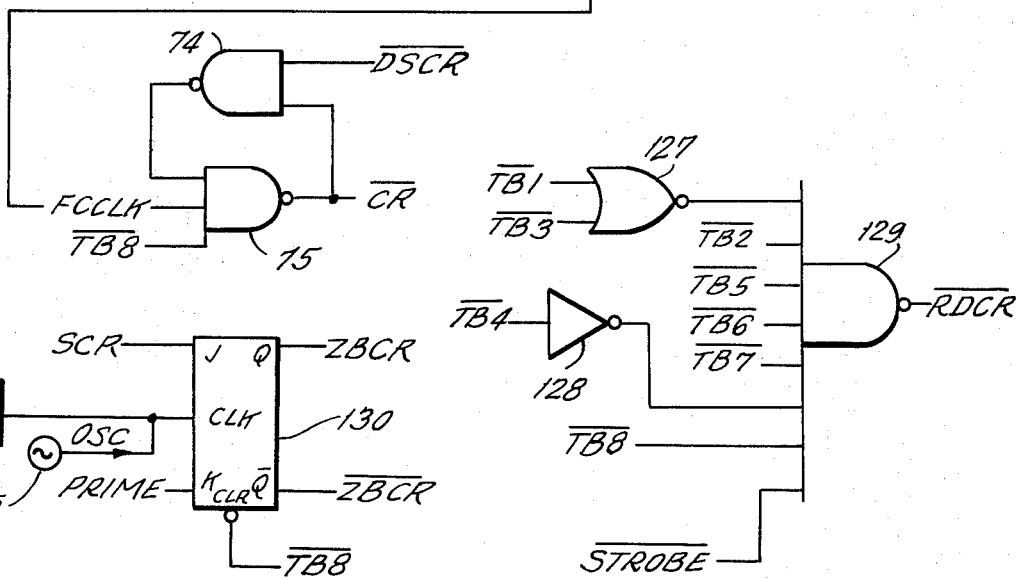

METHOD AND APPARATUS FOR PRINTING SEGMENTED CHARACTERS

BACKGROUND OF THE INVENTION

Dot matrix printers exist in a variety of forms in the prior art. One typical high-speed dot matrix printer of the impact type is described in U.S. Pat. No. 3,703,949 issued Nov. 28, 1972 to the assignee of the present invention. The printer comprises a print head mounted upon a carriage adapted to move across a paper document. The print head is provided with a plurality of vertically aligned print wires operated in a reciprocating manner by actuating solenoids. The printer is designed to sequentially print vertically aligned dot column patterns. In one typical arrangement the print head is provided with seven vertically aligned print wires. Five adjacent dot column patterns collectively define each alphabetic and numeric character within a seven row by five column dot matrix. FIG. 2 of the above mentioned U.S. Pat. No. 3,703,949 shows typical numeric and alphabetic character patterns which collectively define a seven row by five column matrix having a capability of printing up to a maximum of 35 dots to collectively form alphabetic and numeric characters, punctuation symbols and the like. A typical character height is of the order 0.10 inches.

In many applications it is desirable to provide printers capable of producing printed formats which include the capability of printing characters of single, double and triple and even n-times the size of the standard 5×5 character set.

The straightforward approach toward providing such a capability is to provide a register having a plurality of stages equal in number to the number of dot columns capable of being printed along one line of print with each stage having a capability of storing a plurality of bits equal in number to the standard character height of a character which is three times the size of a standard character. A character will thus be printed within a dot matrix of 21 rows by 18 columns. Thus, the register will have to have a capability of storing 126 binary bits to print the first line of a triple size character. Assuming that printing will occur on three lines of print successively, binary information of a total 378 bits (one bit for each dot position in the 18 × 21 matrix) must be loaded into the register to print a single character of three times the size of a standard character. For a printer having a capability of printing 132 standard size characters per line of print, it is possible to print 46 triple size characters. This would require a total of 17,288 binary bits of information to print one line of triple size characters.

BRIEF DESCRIPTION OF THE INVENTION

The present invention is characterized by providing method and apparatus for printing single, double and triple size characters, as well as expanded characters, wherein the double and triple size characters are printed by utilizing segmented character patterns stored within Read Only Memories (ROMS) and wherein each segmented pattern is identified by a six-bit binary word applied to the appropriate ROM, together with STROBE pulses to sequentially read out each dot column pattern within a segmented pattern to cause sequential printing of each dot column pattern of the segmented pattern. Thus, a total of 414 six-bit binary words (for a grand total of 2484 binary bits) is required to print one full line of triple size characters. It can therefore be seen that less than 1/7th the amount of binary information is required to print triple size characters when employing the unique method and apparatus of the present invention.

The apparatus of the present invention is comprised of a shift register having a plurality of stages equal in number to the number of standard size characters capable of being printed along a single line. Each stage is capable of storing an eight-bit binary word in an octal code format. The eight-bit binary words are loaded into the shift register. The eight-bit binary code appearing at the output stage of the shift register is applied to one set of inputs of the appropriate ROM. Registration means which identifies the exact position of printing for each dot column pattern is utilized to step a character timing circuit for sequentially reading out each dot column of a segmented pattern. The ROMS then apply the selected dot column to the appropriated print wire solenoids to effect printing of the dot column. In the case for triple size characters, three lines of segmented patterns are printed to produce one line of triple size characters. A similar saving in binary input information is also obtained in printing double size characters. In one preferred printer embodiment having the capability of printing standard size, double size and triple size characters and other symbols, 64 dot patterns and/or dot pattern segments are provided for each of the respective character formats for a total of 192 stored patterns. The segmented patterns may be employed in any combination to form any desired graphic pattern other than alphanumeric data. The mechanical portions of the printer employed for printing single, double and triple size characters may be of either the unidirectional or bidirectional type.

BRIEF DESCRIPTION OF THE FIGURES AND OBJECTS

It is therefore one object of the present invention to provide a novel method and apparatus for printing standard size, double size and triple size characters in which a significant saving in binary input information required to control printing is obtained.

Still another object of the present invention is to provide a novel method and apparatus for printing standard size, double size and triple size characters in which segmented patterns for double and triple size characters are stored within ROMS activated by multibit binary codes to effect printing of each of the segmented patterns which collectively form the double and/or triple size characters.

The above as well as other objects of the present invention will become apparent when reading the accompanying description and drawings in which:

FIG. 2a shows a set of double size characters and numerals.

FIG. 2b shows a set of triple size characters and numerals.

FIG. 3a shows the segmented patterns employed for printing double size characters of the type shown in FIG. 2a.

FIG. 4b is a block diagram showing the character generators and selection logic of FIG. 1a in greater detail.

FIGS. 4c–4f show logic diagrams of additional control circuitry of FIG. 1a in greater detail.

DETAILED DESCRIPTION OF THE INVENTION

Figure 1D:
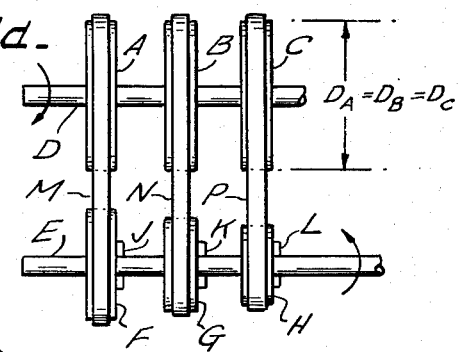
FIG. 1d is a schematic diagram showing a variable line feed mechanism for advancing the paper web.
Figure 1:
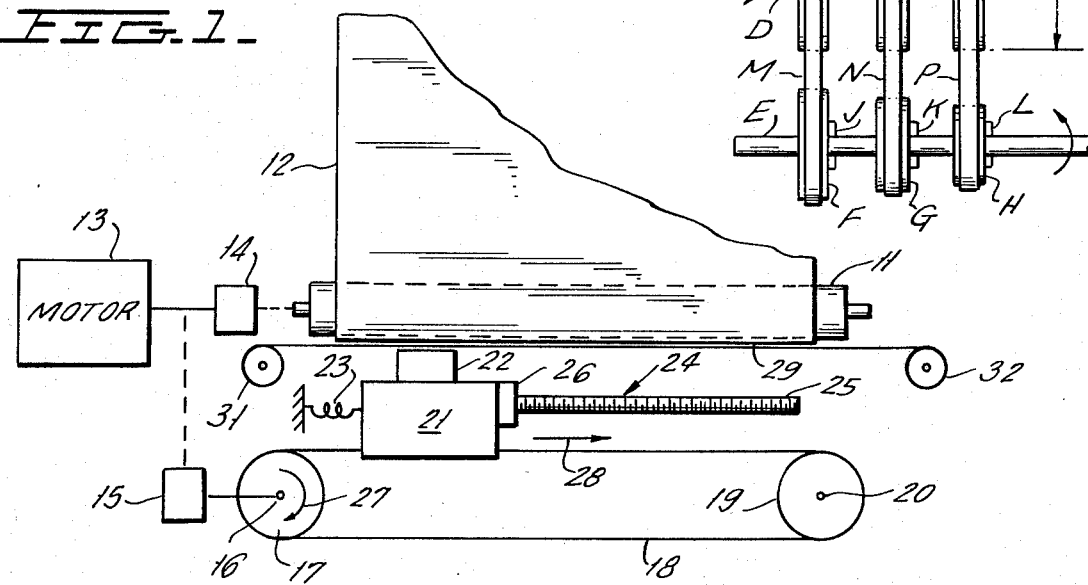
FIG. 1 is a simplified diagram of a printer usable with the techniques of the present invention.

FIG. 1 shows a simplified diagrammatic view of a printer 10 employing the control means of the present invention and which is comprised of a rotatable platen 11 for advancing a paper document 12. Motor 13 is coupled through a selectively energized clutch 14 for operating rotatable platen 11 to advance paper document 12. A clutch 15 is coupled between the output of motor 13 and the shaft 16 of a pulley 17 for selectively rotating pulley 17. A closed loop timing belt 18 is entrained about pulley 17 and a second pulley 19, freewheelingly mounted about shaft 20.

The free ends of timing belt 18 are secured to a carriage assembly 21 having a print head assembly 22 mounted thereon.

An elongated tension spring 23 is secured between portion F1 of the machine frame and carriage 21. A registration means 24 is provided and is comprised of an elongated registration strip 25 mounted in spaced parallel relationship to platen 11 and having a pluality of vertically aligned equispaced transparent slits 25a of narrow uniform width. An electro-optical assembly 26 is mounted to carriage 21 and is comprised of first and second portions (not shown for purposes of simplicity) which are positioned on opposite sides of registration strip 25. One of the aforesaid portions is provided with a light source while the other portion is provided with a phototransistor which is energized by the light source each time the electro-optical assembly 26 passes across transparent slit 25a. The signal generated by the phototransistor provides a STROBE pulse which is utilized to control printing of each dot column so that the dot columns are very precisely located upon the paper document 12.

The operation of the mechanical portions of the printer shown in FIG. 1 are such that clutch 15 is energized to rotate pulley 17 in the direction shown by arrow 27 causing the carriage assembly 21 to move from the left-hand margin of paper document 12 in the direction of arrow 28. STROBE pulses are successively generated by the electro-optical assembly 26 as it passes each transparent slit 25a in stationery registration strip 25.

The print head, in one preferred embodiment, is provided with seven print wires whose rear ends are associated with print wire driving solenoids and whose front ends are aligned along a straight vertical imaginary line so that the free ends of the print wires are positioned immediately adjacent inked ribbon 29 which extends across paper document 12 and which is selectively moved between spools 31 and 32. The solenoids are selectively energized, driving the print wire free ends against the inked ribbon 29 and paper document 12 causing a pattern of dots to be formed on the paper document only upon the occurrence of each STROBE pulse.

Five successive dot column patterns collectively form one standard size character. A space equal in width to one dot pattern is provided between each character. As soon as a line of print is completed, clutch 15 is deenergized decoupling motor 13 from pulley 17. The movement of carriage 21 in the direction shown by arrow 28 causes return spring 23 to be stretched. As soon as clutch 15 is deenergized the carriage 21 is free to return under the influence of stretched spring 23 to the left-hand end of the paper document preparatory to the printing of the next line of characters whereupon the clutch 14 is energized to rotate platen 11 through motor 13 and hence advance the paper document, typically by one line, whereupon the aforesaid operations are repeated for printing successive lines of standard size characters. The paper document is advanced in an incremental fashion whereby each increment is 1/6 inch when printing characters of the standard size character set thus providing characters of 0.10 inch height with a spacing of approximately 0.067 inch between succeeding line of characters.

In computer printout where condensed printing and a higher volume of printed material per page is required, a form feed unit of eight lines per inch is utilized. Thus, adjacent lines of standard size characters of 0.10 inch are spaced a distance of 0.10 inch are spaced a distance of 0.025 inch.

A ten line per inch form feed is utilized for segmented character printing and provides vertical spacing such that there is no gap between adjacent lines of printed segmented patterns. For example, a dot on the bottom row of a segmented pattern contained on a first printed line is spaced from a dot in the same column and located in the top row of a segmented pattern contained in the next succeeding printed line by a distance of 0.015 inch (center to center spacing), which is also equal to the distance between dots of the same column in adjacent rows of the same segmented pattern as well as being the same spacing between dots in the same row and adjacent columns of the same segmented pattern. By making multiple passes of the print head a large block character of n times the size of a standard size character ($n = 2, 3, 4, \ldots$) can be formulated by logically addressing the various segmented patterns contained in the character generators, as will be more fully described.

The line feed mechanism may comprise a 10 LPI (lines per inch) capability; a 6 and 10 LPI capability or a 6, 8 and 10 LPI capability. In the last case the printer may be operator selectable for 6 or 8 LPI and computer or remotely selectable from either 6 or 8 LPI to 10 LPI. The computer selection code may, for example, be an escape code followed by a DC-1 code, both of which code formats are standard ASCII codes. A typical sequence might comprise the printing of lines of text at the top of a page in either 6 or 8 LPI format while printing standard size characters. The computer would then command the printer to select the 10 LPI format to print a graphic pattern, plot, graph (curve), etc. in the center portion of the page whereupon the computer would then command the printer to return to either the 6 or 8 LPI format (originally selected by the operator) to complete the pages by printing additional text. The line feed mechanism may be comprised of three substantially identical gears A, B and C locked to a drive shaft D (see FIG. 1d) which is driven by the motor (not shown). A driven shaft E is coupled to the paper feed mechanism and has three gears F, G and H of different diameters and being capable of being selectively locked to shaft E by means of clutch mechanisms J, K and L, respectively. Gears A, B and C, respectively, drive gears F, G and H by the closed loop timing belts M, N and P. In operation, when the motor is energized and is coupled to shaft D, gears A, B and C rotate in unison. Gears F, G and H are driven in unison through timing belts M, N and P. However, gears F, G and H rotate in a free-wheeling manner about shaft E as long as the clutch mechanisms J, K and L are deenergized.

When one of the clutch mechanisms is energized, its associated gear drives shaft E which, in turn, rotates the paper feed tractor assemblies (or paper platen, as the case may be) to advance the paper web at the appropriate LPI rate, gears F, G and H, respectively, driving the paper advance mechanism at 6, 8 and 10 LPI.

The printer shown in FIG. 1 is of the unidirectional type in which printing occurs only when the carriage moves from left to right. The carriage is moved back to the left-hand margin by return spring 23 typically at a rate much faster than the printing rate during which the carriage is moved from left to right. Although not shown for purposes of simplicity, return spring 23 may be eliminated and a suitable clutch assembly may be utilized to move timing belt 18 and hence carriage 21 in both the forward and reverse direction so as to provide either unidirectional or bidirectional printing, which technique is set forth in detail in co-pending application Ser. No. 414,645 filed Nov. 12, 1973 and assigned to the assignee of the present invention.

Figure 1A:
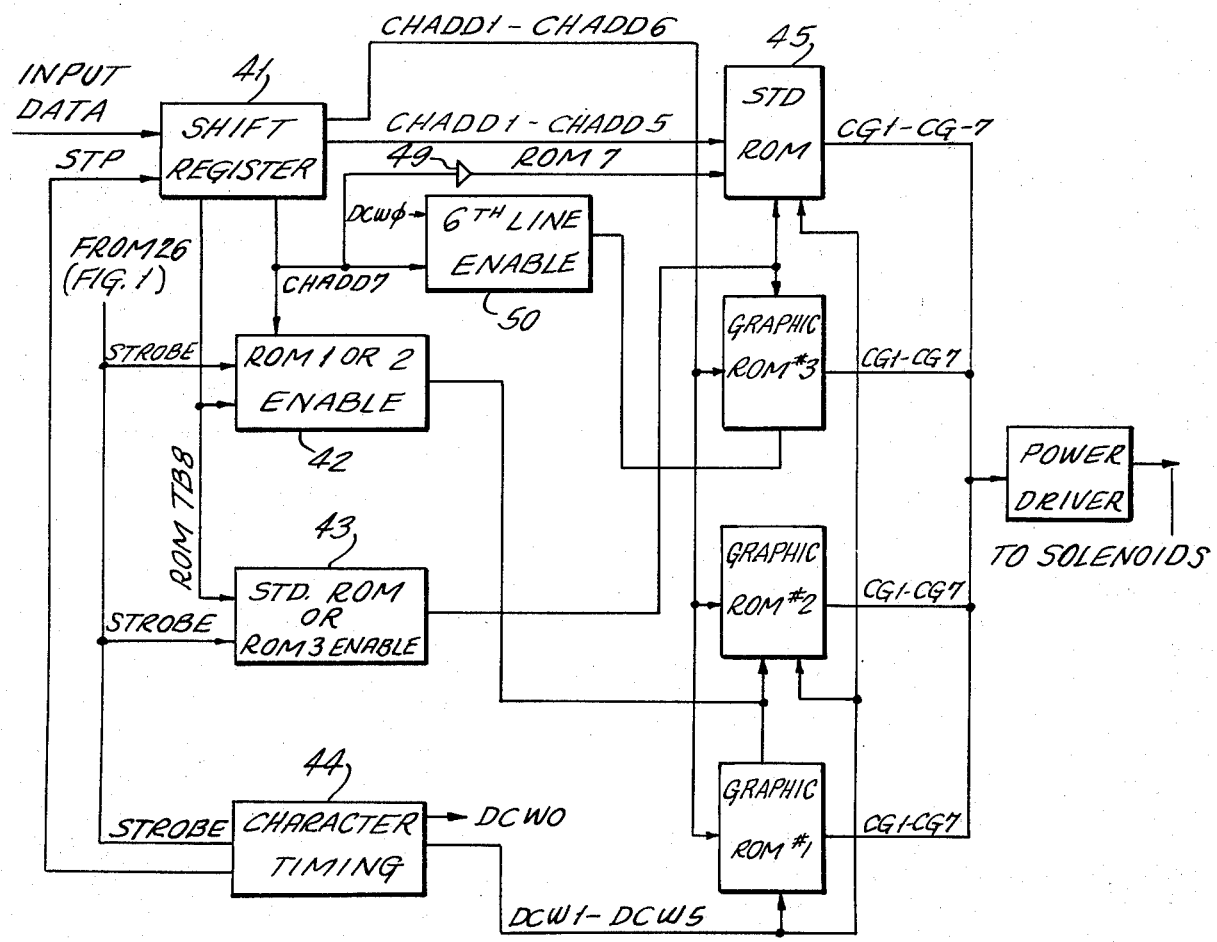
FIG. 1a is a simplified block diagram of the electronics employed for printing standard size, double size and triple size characters.

FIG. 1a is a block diagram showing the system electronics 40 which may be utilized with the printer apparatus 10 of FIG. 1 to effect printing of standard size, double size and triple size characters.

Input data in the form of eight-bit binary words are sequentially applied to the input of shift register 41. When the register is either fully loaded to print a full line of print or is partially loaded to print a less than full line of print, the STROBE pulses developed by the electro-optical circuit 26 of FIG. 1 are sequentially applied to the enabling circuits 42 and 43 and the character timing circuit 44. The code for the first character (i.e., the left-handmost character when in a unidirectional printing mode) appears at the output stage of shift register 41 and is simultaneously applied to the ROMS 45–48. Although each code word is comprised of six-bits loaded into shift register 41 to identify the desired dot pattern, in actuality, each code word is further accompanied by two bits which are utilized to indicate to the printer whether standard size characters, expanded characters, double size characters or triple size characters are to be printed. These bits are selectively applied to the enabling circuits 42 and 43 to control the selection of the ROMS in a manner to be more fully described.

As the carriage 21 moves in the printing direction, the STROBE pulses are applied to gates 42 and 43 and to character timing circuit 44 which successively develops the timing pulses for selecting each dot column of the selected character or segmented pattern from the enabled character generator causing the appropriate dot columns to be sequentially read out of the selected ROM whereupon the dot column positions to be printed are simultaneously applied to the power driver circuitry and ultimately to the print wire solenoids to cause the print wires to impact the inked ribbon and paper document.

In the preferred embodiment, each standard size character is comprised of five dot column patterns each containing seven dot positions. Each STROBE generates an STP signal. It is only during DCW0 that STP has any effect, at which time the STROBE is ANDed with DCW0 at gate 68 (FIG. 4d) so that the leading edge of the STROBE serves to update the shift register 41 (see FIG. 4a), i.e., serves to advance the next coded character in register 41 to the output stage thereof. The time interval $t_1$ between the trailing edge of STP and a STROBE pulse (see FIG. 1c) is thus available for printing. Every sixth STP signal creates CLKTB which is applied to shift register 41 during the non-printing space between characters to shift the eight-bit binary code word for the next character to be printed into the output stage of the shift register. This operation is repeated with the printing of each successive character.

In order to print either double or triple size characters, the segmented patterns are each constructed within a 6 by 7 dot matrix. The segments are programmed in such a manner as to construct any desired graphic pattern or any size alphanumric character. For this reason, the printer must be capable of printing during the time where spaces between standard size characters are normally provided, which time will be referred to hereinbelow as the DCW0 time. The printer is now capable of creating a dot anywhere on the paper document.

The leading edge of each STROBE pulse, which is the STP pulse, is applied to the character timing circuit 44 to generate CLKTB pulses, as was decribed hereinabove. The trailing edge of each CLKTB pulse increments the shift register during the DCW0 time allowing printing during this time.

The graphics printer contains a total of four ROMS comprised of a standard ROM 45 for printing a total of 64 standard size characters, numbers and other symbols within a 5 × 7 dot matrix Roms and three graphics 46, 47 and 48 collectively containing a total of 128 segmented patterns. When the seventh and eighth bits of each code word are low, the output of inverter 49 and gate 43 enables the standard ROM 45 and as the DCW count sequentially advances from DCW1 to DCW5, the dot columns of a 5×7 standard size character are printed. The DCW0 count is utilized to shift the next code word into the output stage of shift register 41.

When the seventh and eight bits of each code word are low and high, respectively, and upon the occurrence of a DCW0 count, gate 50 is enabled causing the first dot column of the segmented character pattern stored in graphic ROM to be printed. While graphic ROM 47 is enabled, graphic ROM 48 is also enabled and the second dot column of the segmented character pattern is printed during the DCW1 count. The third through the sixth dot columns of the segmented pattern are printed upon the occurrence of the DCW2 through DCW5 counts.

When the seventh and eighth bits of each binary word are high, gates 42 and 43 enable graphic ROMS 46 and 47 causing the first through the sixth dot columns of the segmented pattern to be sequentially printed upon the occurrence of the DCW0 through DCW5 counts.

Figure 4A:
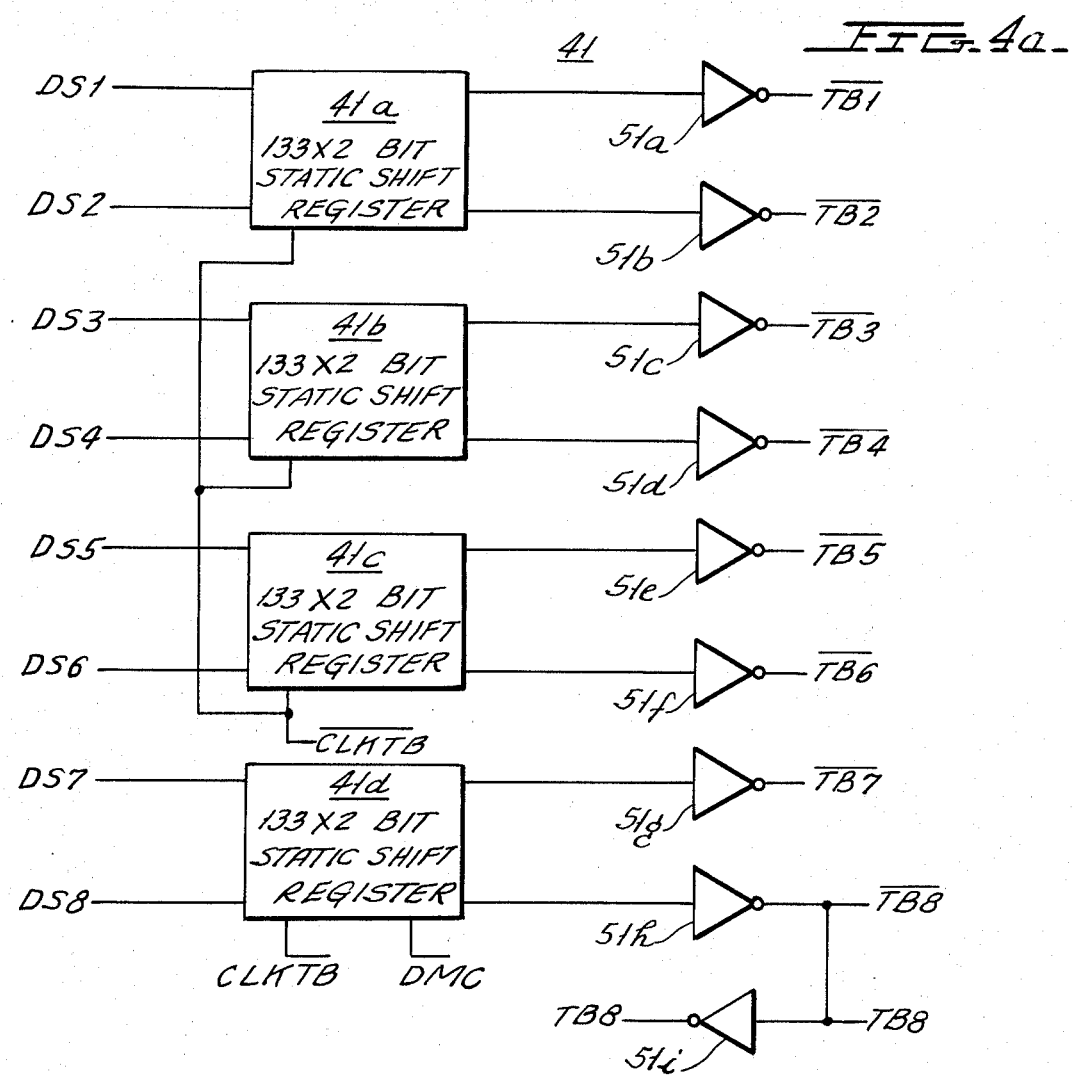
FIG. 4a is a block diagram showing the register of FIG. 1a in greater detail.

FIG. 4a shows a more detailed block diagram of register 41 which is comprised of four 133-stage static shift registers 41a–41d each capable of storing two binary bits per stage. The eight binary bits DS1–DS8 of each eight-bit binary word derived from a data source such as, for example, a computer, are applied to associated inputs of the four registers. As each word is loaded into the left-hand or input stage of each register, a clock pulse $\overline{\text{CLKTB}}$ is applied to the shift input of each register stage whereupon a new eight-bit binary word is loaded into the left-handmost stage and the words already loaded therein are shifted one stage to the right. The output terminals of the output stages in each shift register are coupled through inverters 51a–51h whose outputs $\overline{\text{TB1}}$–$\overline{\text{TB8}}$ are simultaneously aplied to respectively designated inputs of the ROMS 45–48, shown in FIG. 4b.

The PRIME signal shown in FIG. 4c is developed upon initial turn-on of the printer in order to initialize the printer electronics. The $\overline{\text{PRIME}}$ signal is applied to bistable flip-flop 136 (FIG. 4f) causing 136a (DMC) to go low and thereby force the output of gate 66 high (FIG. 4d). OSC pulses are thus passed by enabled gate 67 and are applied to gate 69. The remaining inputs of gate 69 are high causing CLKTB pulses to develop at the output of gate 69 to clear register 41. The $\overline{\text{PRIME}}$ signal applied to bi-stable flip-flop 63 of FIG. 4c creates the signal DMC which causes a dummy character to be loaded into the input stage of the shift register 41d prior to the loading of any data words (FIG. 4a). Once the dummy character is loaded into register 41 the register is ready for the receipt of data.

Considering FIG. 4d, and with register 41 having been cleared and a dummy character having been entered in the left-handmost or input stage, the operating sequence is such that a load operation, i.e., the loading of register 41, is under control of the remote facility such as a computer which develops the signals applied to enable gate 71 (FIG. 4d) thereby enabling gate 69 to develop CLKTB pulses at the rate at which eight bit coded characters (DS1–DS8) are applied to register 41 (FIG. 4a) by the remote facility. The dummy character, having initially been loaded into register 41 is thus shifted one position to the right as each coded character is loaded into memory. Situations where a full line (i.e., 132 coded characters) is loaded into register 41, the dummy character will then appear in the right-handmost stage of register 41 to develop a high TB8 condition which is applied to one input of gate 81 (FIG. 4f). Assuming the carriage has returned to the left-hand margin, the signal RPTSW is developed at the output of inverter 76 of FIG. 4e and is applied to the other input of gate 81 of FIG. 4f which condition drives the output of gate 81 low causing the output of gate 82 to go high. This output is coupled to one input of gate 83 whose remaining inputs are high when PRIME is removed, when the printer is not at the end of print or right-hand margin position, and when no remote carriage return signal has been decoded. This causes the output of gate 83 to go low which condition is applied to both inputs of gate 84 to develop a high CIP signal indicating that the carriage is in process. The low output of gate 83 is further applied to gate 85 whose remaining input DCLT is high (having been set high by the trailing edge of PRIME by bistable flip-flop 139). Gate 85 thus develops the signal FWD which is applied to the forward clutch driver amplifier for causing clutch 15 of FIG. 1 to couple motor 13 to pulley 17 thereby starting the printing operation. The optical means 26 cooperates with timing strip 24 to generate the STROBE pulses. The first STROBE pulse is ANDed with DCW0 at gate 68 to cause gate 69 to develop a CLKTB pulse to shift the dummy character out of the right-handmost stage of register 41 and shift the first character to be printed into the right-handmost stage of the register. Pulses DCW1–DCW5 control the printing of each dot column in coincidence with each succeeding STROBE pulse. Thereafter, every sixth STROBE pulse shifts the character just printed out of the right-handmost stage of register 41 and shifts the next character to be printed into the right-handmost stage. For the case of a full 132 character length line, the printing of the last character causes the print head to be moved to the right-hand margin at which time the end of print signal is developed to initiate a carriage return and line feed operation.

For lines containing less than a full line of print, the remote facility, after inserting the characters which represent a partial line in register 41, transmits a code which indicates that the last character of this "short" line has been loaded into register 41. This code develops signal SCR which is applied to bistable flip-flop 130 of FIG. 4d to create a high ZBCR signal. This signal is applied from the output of bistable flip-flop 130 to one input of gate 65. The other input $\overline{\text{TB8}}$ will be high since the dummy character will not have been shifted at this time to the right-handmost stage of register 41 thus causing the output of gate 65 to go low. This low condition forces the output of gate 66 to go high causing oscillator pulses to be passed by gates 67 and 69 to apply CLKTB pulses to register 41. Thus the coded characters and dummy character already loaded into shift register 41 will continue to be shifted toward the right until the dummy character reaches the right-handmost stage at which time $\overline{\text{TB8}}$ goes low causing the output of gate 65 to go high forcing the output of gate 66 to go low and disabling gate 67 to prevent oscillator pulses to be passed by gate 67 so as to terminate the production of any further CLKTB pulses. The development of the DSCR signal causes its complement $\overline{\text{DSCR}}$ to go low. This condition is applied to one input of gate 74 (FIG. 4d) driving its output high and hence causing the output of gate 75 to develop a low $\overline{\text{CR}}$ which loads a carriage return code into register 41 immediately after the last code for a character to be printed is loaded into register 41 and just prior to the shifting of the "short" line of characters and the dummy character toward the right-hand end of register 41.

Thereafter the operation is similar to that described hereinabove wherein as soon as the dummy character reaches the right-handmost stage the printing of the "short" line begins.

Figure 4E:
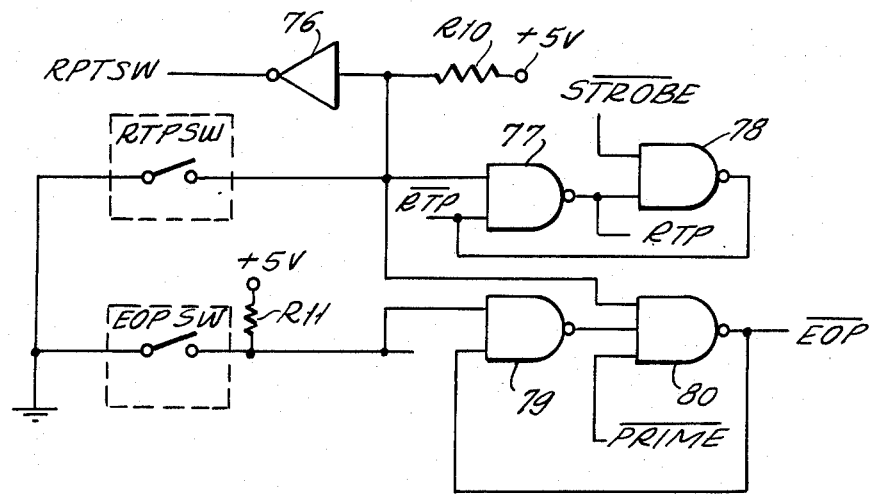

FIG. 4e shows the circuitry for identifying the end positions of the print head. Reed switches S5 and S6 are positioned at the left-hand and right-hand margins, respectively, of the paper document and are activated by permanent magnet members appropriately mounted upon the carriage assembly so that when the carriage assembly moves to the left-hand margin of the paper document, switch S5 is closed and conversely, when the carriage moves to the right-hand margin of the paper document, switch S6 is closed. Considering FIG. 4f in conjunction with FIG. 4e, the closure of switch S5 causes inverter 76 to develop a high RPTSW signal which is applied to one input of gate 81 shown in FIG. 4f, whose other input is coupled to the TB8 output of register 41d which is high when the dummy character reaches the output stage of the register causing the output of gate 81 to go low, in turn, causing the output of gate 82 to go high. So long as no carriage return is detected and printing has not been completed and a PRIME signal has not been developed, the remaining three inputs of gate 83 will be high causing its output to be low which, in turn, causes NOR gate 84 to develop a $\overline{\text{CIP}}$ signal indicating that the carriage is in progress. Simultaneously therewith NOR gate 85 develops the FWD signal which is utilized to energize the forward clutch driver 15 (FIG. 1) to move the carriage assembly and hence the print head.

Returning to a consideration of FIG. 4d, gate 68 now serves as the means for applying input pulses to gate 69 to develop the signal CLKTB which functions to shift each binary coded word towards the output stage of register 41.

Figure 1B:
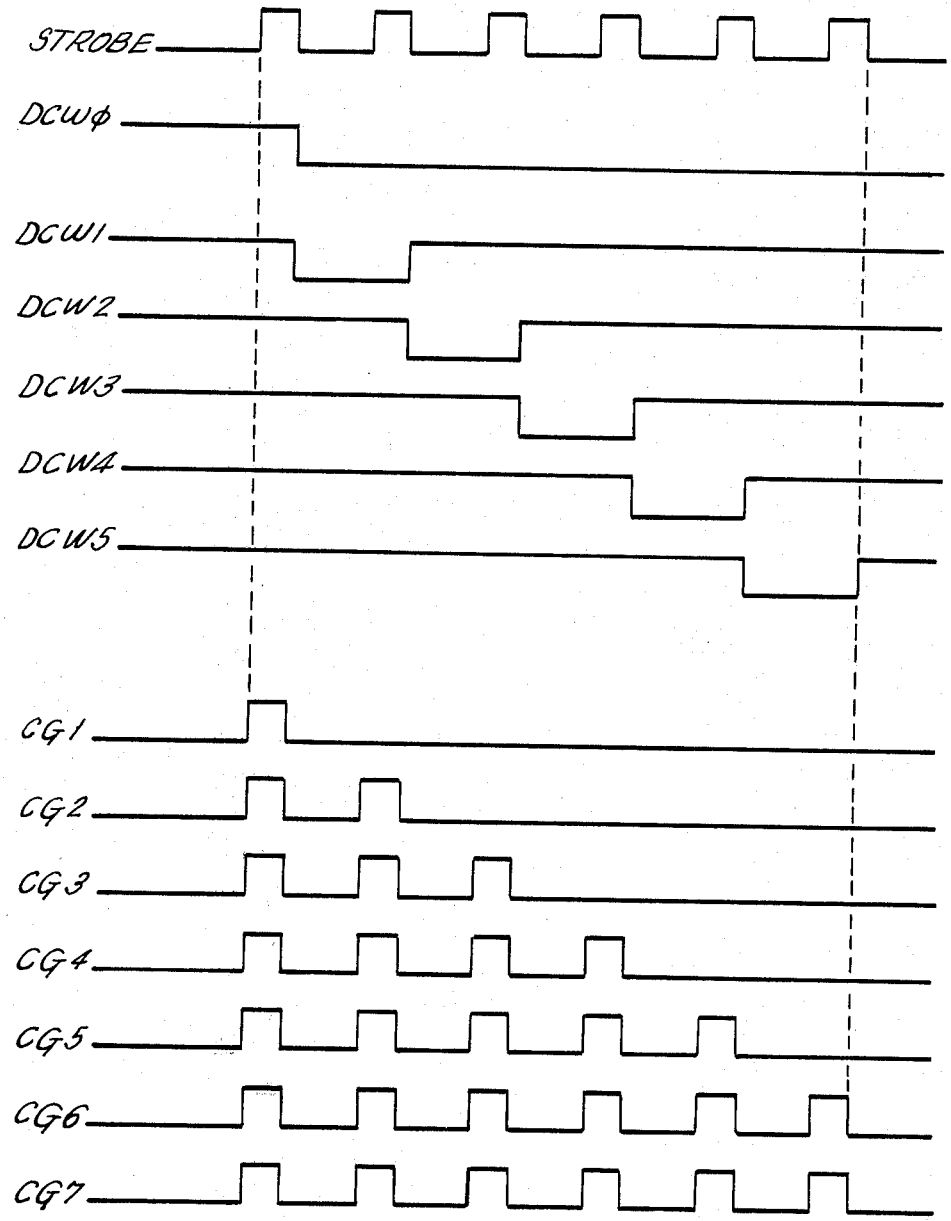
FIGS. 1b and 1c show a plurality of waveforms useful in explaining the timing for printing segmented characters.
Figure 1C:
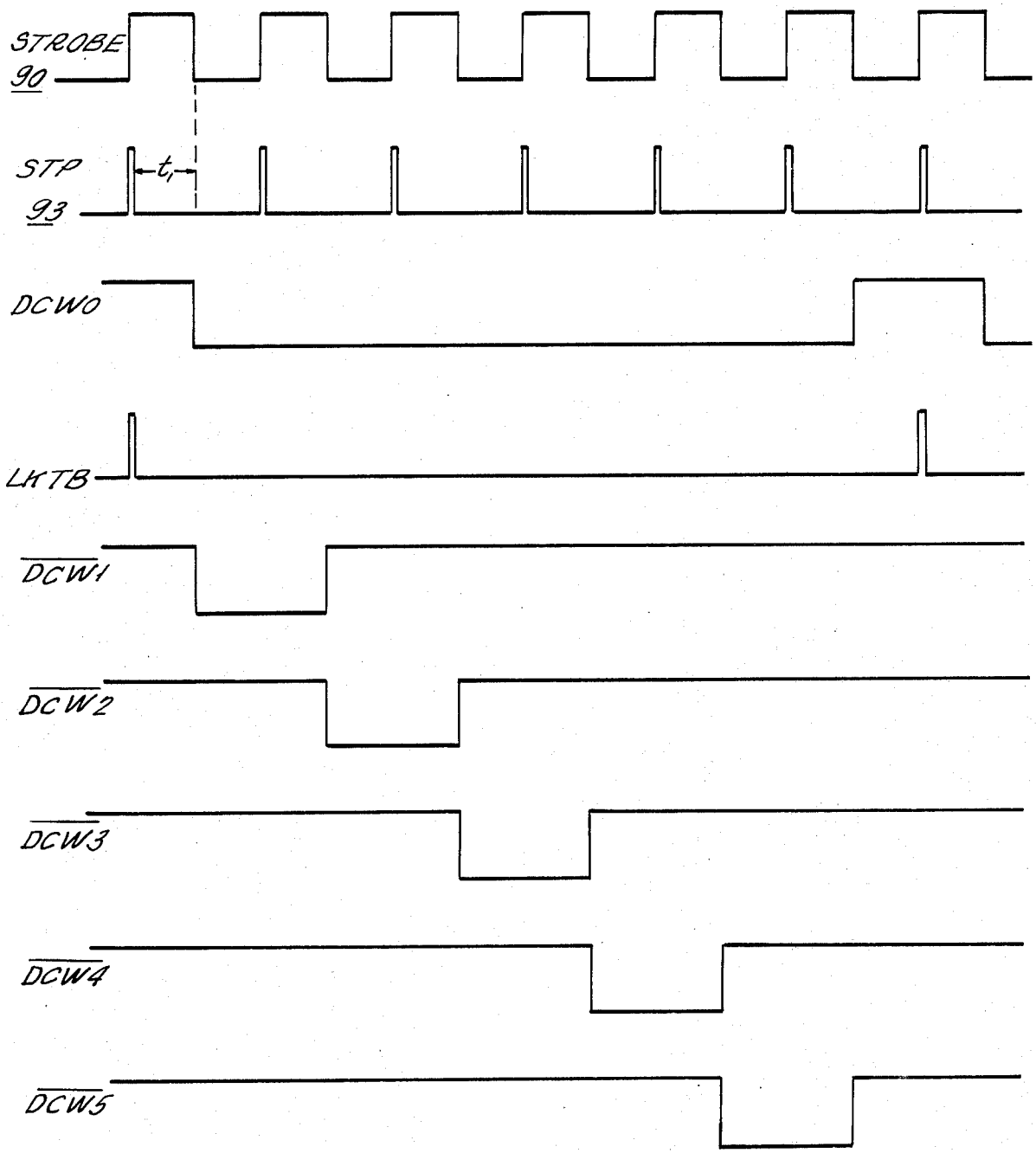

A movement of the carriage assembly causes the electro-optical means 25, shown in FIG. 1, to apply pulses to one input of monostable multivibrator 133 shown in FIG. 4c, which functions to develop a square-shaped STROBE pulse (see FIG. 1c). Each STROBE pulse is applied to one input of three-stage binary counter 91 whose output is coupled to associated inputs of decoder circuitry 92 for developing the timing pulses DCW0–DCW5 which function to sequentially control the rate of dot column patterns, as will be more fully described.

The development of the DCW0 signal during the generation of standard size character occurs after the completion of the last printed character and before instituting printing in the first dot column of the next character and is thereby utilized to shift the next binary coded word into the output stage of register 41, this signal being applied to one input of gate 68 shown in FIG. 4d.

The timing can best be understood from a consideration of the waveforms of FIG. 1c. As shown in FIG. 4c, with the carriage moving in the forward or print direction, the output of the electro-optical means 25 of FIG. 1 is applied to monostable multivibrator 133 to develop the STROBE waveform 90 of FIG. 1c. This signal is applied to one input of monostable multivibrator 91 to develop the very narrow pulse STP shown by waveform 92. Each STROBE signal increments the count of counter 91 shown in FIG. 4c, whereupon decoder 92 develops the outputs DCW0–DCW5 with each incremental count. The simultaneous presence of the DCW0 and STP signals applied to gate 68 of FIG. 4d serves to generate the CLKTB pulse, also shown in FIG. 1c, which pulse is employed to shift the next coded word into the output stage of the buffer register 41.

FIG. 1b shows the timing waveforms developed for printing a triangular shaped dot matrix pattern wherein the waveforms CG1–CG7 represent the signals sequentially applied to the print wire solenoids during the DCW0–DCW5 times for creating the segmented pattern.

Let it be assumed that standard size characters are to be printed. Considering FIG. 4b, signal $\overline{\text{TB8}}$ will thus be high causing the output of gate 110 to go low upon the occurrence of a STROBE signal to enable character generator 45. The binary word now appearing in the output stage of register 41 has its inputs respectively coupled to inputs $\overline{\text{TB1}}$–$\overline{\text{TB6}}$ of character generator 45. The DCW1–DCW5 signals are sequentially generated in the pattern shown in FIG. 1c causing the vertical dot patterns of the five columns forming each standard size character to appear at the outputs CG1–CG7 of the character generator. These outputs are coupled through appropriate driver circuits to associated solenoids of the print head for selectively activating those solenoids at the positions where a dot is to appear. Thus, in the standard size format alphabetic characters, numerals, punctuation marks and the like are created within a 5×7 dot matrix.

When the signal ROMTB8 is high and $\overline{\text{TB7}}$ is high, gates 118 and 119 will be enabled when the signals STROBE and DCW0 are both high, thereby enabling graphic ROM 46 to print the first dot column of a segmented pattern. While graphic ROM 46 is enabled, graphic ROM 48 is also enabled since $\overline{\text{TB7}}$ is high and enables gate 112 as a result thereof, which condition is inverted at 113 to enable gate 114 when ROMTB8 is high. Thus, with ROM 48 enalbed, column 2 of the segmented pattern is printed when signal $\overline{\text{DCW1}}$ is generated. Similarly, columns 3–6 are printed as $\overline{\text{DCW2}}$–$\overline{\text{DCW5}}$ consecutively come true. Thus, it can be seen that printing occurs during DCW0 time, as well as during DCW1–DCW5 times so that a dot may be printed at every position along the line of the paper document.

With ROMTB8 high and TB7 high, the graphic ROMS 46 and 47 are both enabled, TB7 being ANDed with the DCW0 signal by gate 120 to enable ROM 46 while ROM 47 is enabled through inverter 116 and gates 115, and 117. Thus, graphic ROM 46 is utilized to print the first dot column for segmented patterns while the second through sixth dot column patterns for each segmented pattern is printed either by graphic ROM 47 or graphic ROM 48.

Once the printer carriage reaches the right-hand margin of the paper document, the switch S6 (see FIG. 4e) causes the output of gate 79 to go high. Since at this time switch S5 is open and no PRIME signal is being developed, the remaining inputs to gate 80 are high causing its output $\overline{\text{EOP}}$ to be low, which level is applied to one input of gate 83 (FIG. 4f causing its output to go high thereby developing a high CIP signal causing the signal $\overline{\text{CIP}}$ developed by gate 84 to go low as well as causing the FWD signal to go low, thereby deenergizing the forward clutch drive. The high $\overline{\text{CIP}}$ signal causes the output of gate 86 to go low causing the output of gate 87 to develop a high CIR (carriage is returning) signal indicating that the carriage is now returning after the completion of a full line of print preparatory to printing the next line.

In order to terminate printing after a partial line of print, a carriage return code is loaded into register 41 after the last graphic pattern code is loaded and, upon reaching the right-handmost stage of register 41, is decoded by gates 127, 128 and 129 to develop the signal $\overline{\text{RDCR}}$ which similarly is applied to one input of gate 83 (FIG. 4f) to deenergize the forward clutch and hence terminate printing.

Gates 95–97, shown in FIG. 4c, are employed to divide the timing by one-half for the printing of expanded characters which are simply double width characters wherein each dot column pattern is printed twice in succession, which technique is described in detail in previously mentioned co-pending application Ser. No.

414,645 now U.S. Pat. No. 3,858,703, issued Jan. 7, 1975.

FIGS. 2a and 2b show alphabetic and numeric characters of double and triple normal size format and each character is the octal code representative of the segmented pattern required to form each character. For example, considering FIG. 2a, the alphabetic character "A" is developed by employment of four segmented patterns whose octal codes are given beneath each character. FIG. 3b shows the segmented patterns utilized in various combinations to form the alphabetic characters of FIG. 2a. Considering, for example, the double-normal size character "A", the four segmented patterns employed for forming the character are designated by their octal codes which, in the example given, are 316; 331; 333; and 332. In printing the double size character "A", the segmented pattern identified by octal code 316 is printed first, immediately followed by the segmented pattern identified by octal code is 331. As soon as the first line of print is completed, a carriage return and line feed operation is performed wherein the lower "halves" of the double normal size characters are printed whereupon the segmented pattern identified by octal code 333 is printed, followed by the segmented pattern whose octal code is 332. The document 12 (FIG. 1) is advanced a distance equal to the height of a segmented pattern so that no "space" is provided between segmented patterns forming a double size character.

Figure 2C:
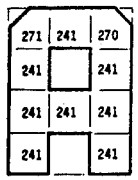
FIGS. 2c and 2d show sets of characters and numerals four and seven times standard size, respectively.
Figure 2C:
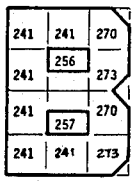
Figure 2C:
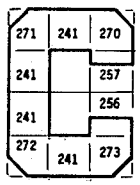
Figure 2C:
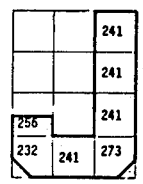
Figure 2C:
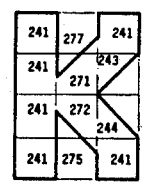
Figure 2C:
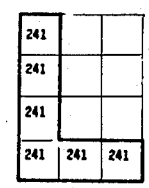
Figure 2C:
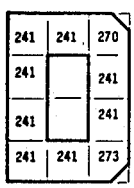
Figure 2C:
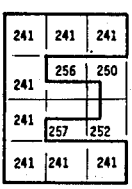
Figure 2C:
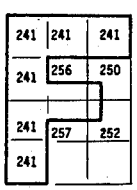
Figure 2C:
Figure 2C:
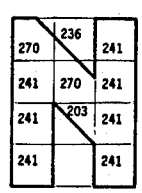
Figure 2C:
Figure 2C:
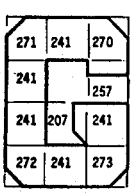
Figure 2C:
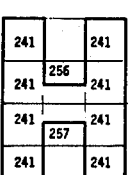
Figure 2C:
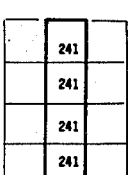
Figure 2C:
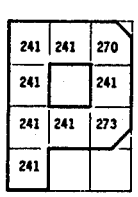
Figure 2C:
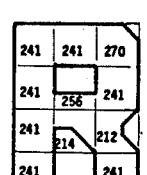
Figure 2C:
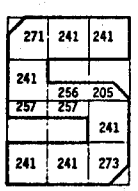
Figure 2C:
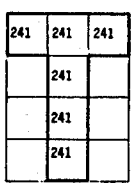
Figure 2C:
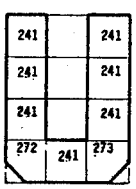
Figure 2C:
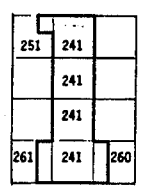
Figure 2C:
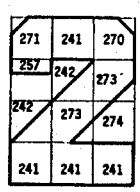
Figure 2C:
Figure 2C:
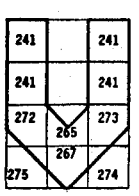
Figure 2C:
Figure 2C:
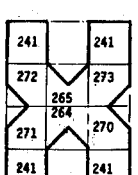
Figure 2C:
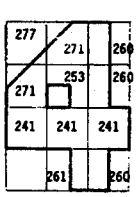
Figure 2C:
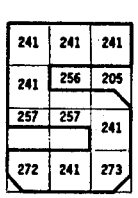
Figure 2C:
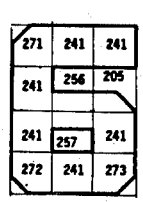
Figure 2C:
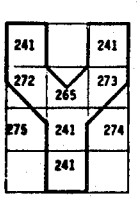
Figure 2C:
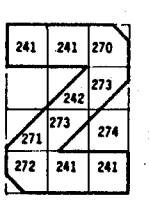
Figure 2C:
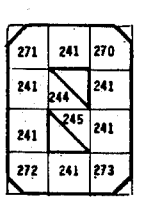
Figure 2C:
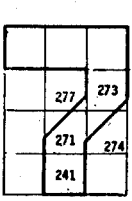
Figure 2C:
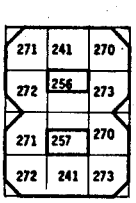
Figure 2C:
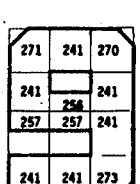
Figure 2D:
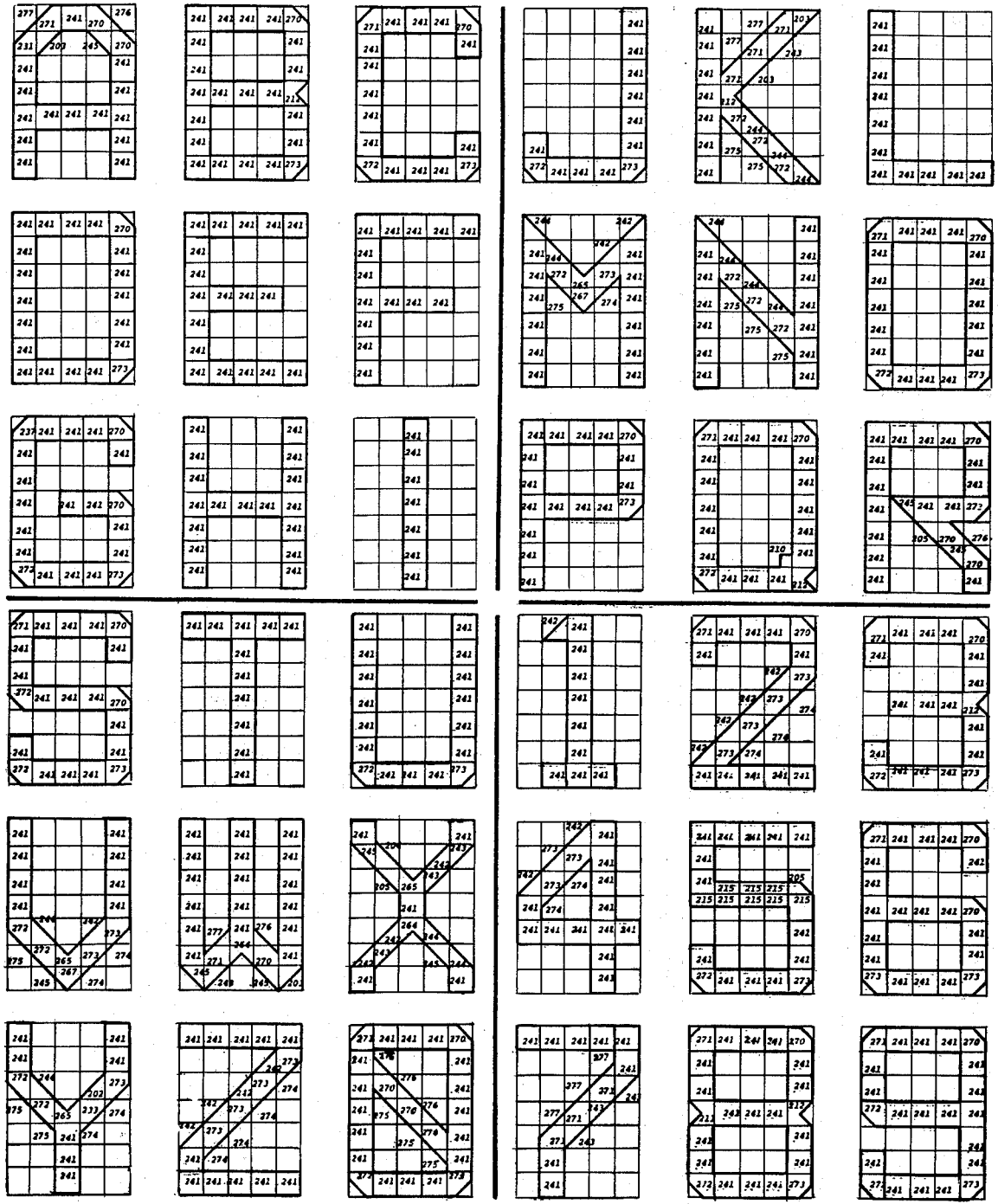
Figure 3A:
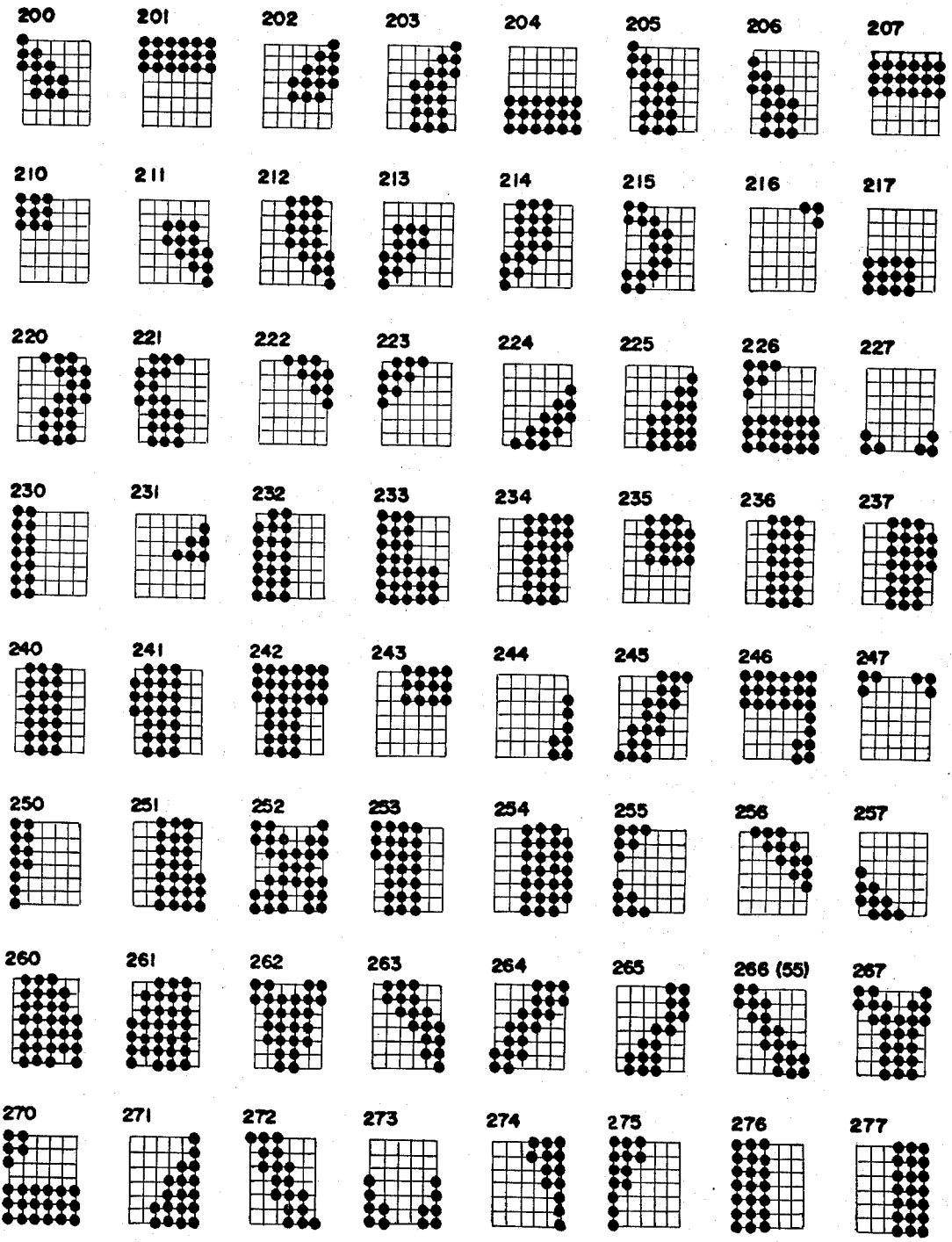
Figure 3B:
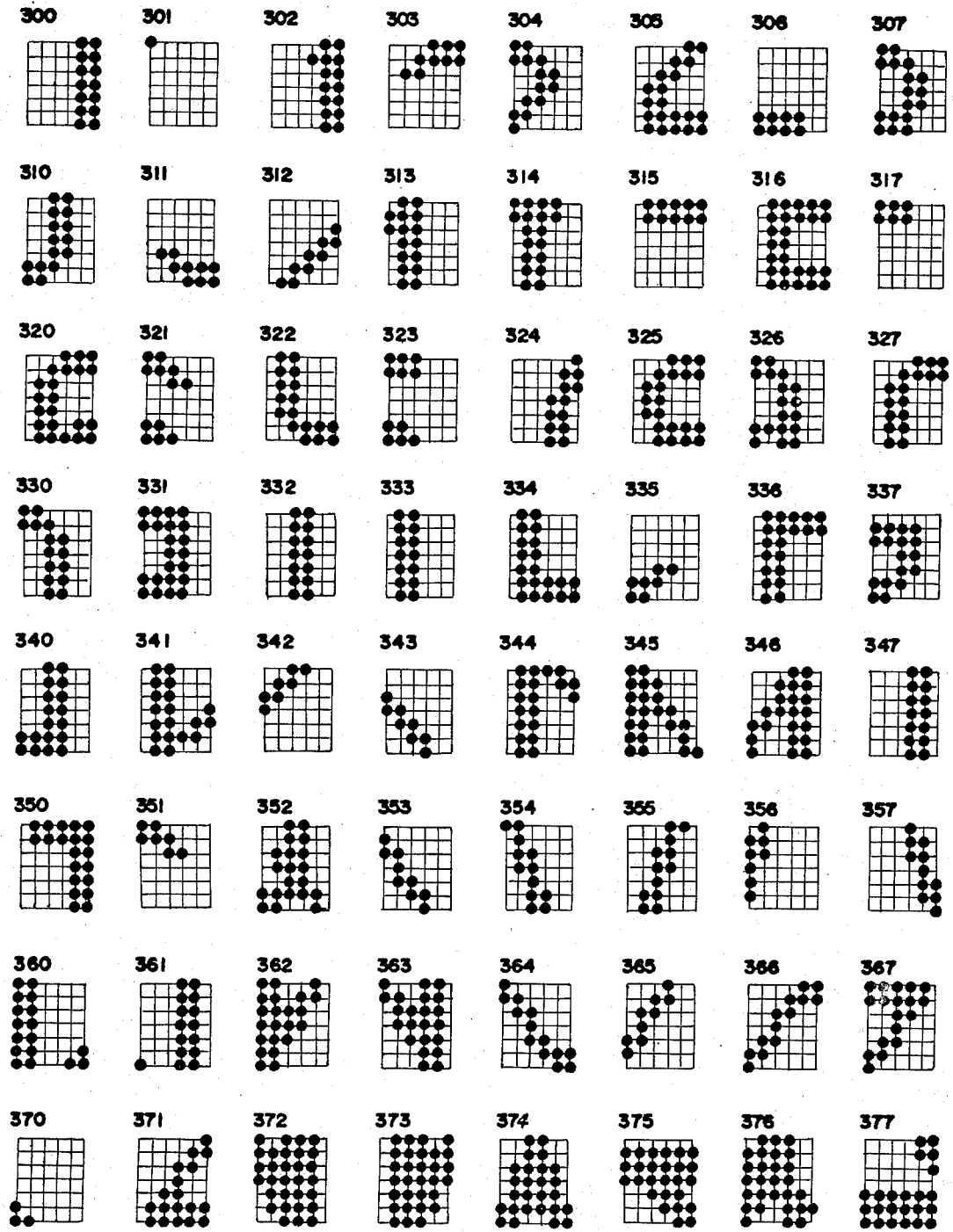
FIG. 3b shows the segmented patterns employed for printing triple size characters of the type shown in FIG. 2b.
Figure 3C:
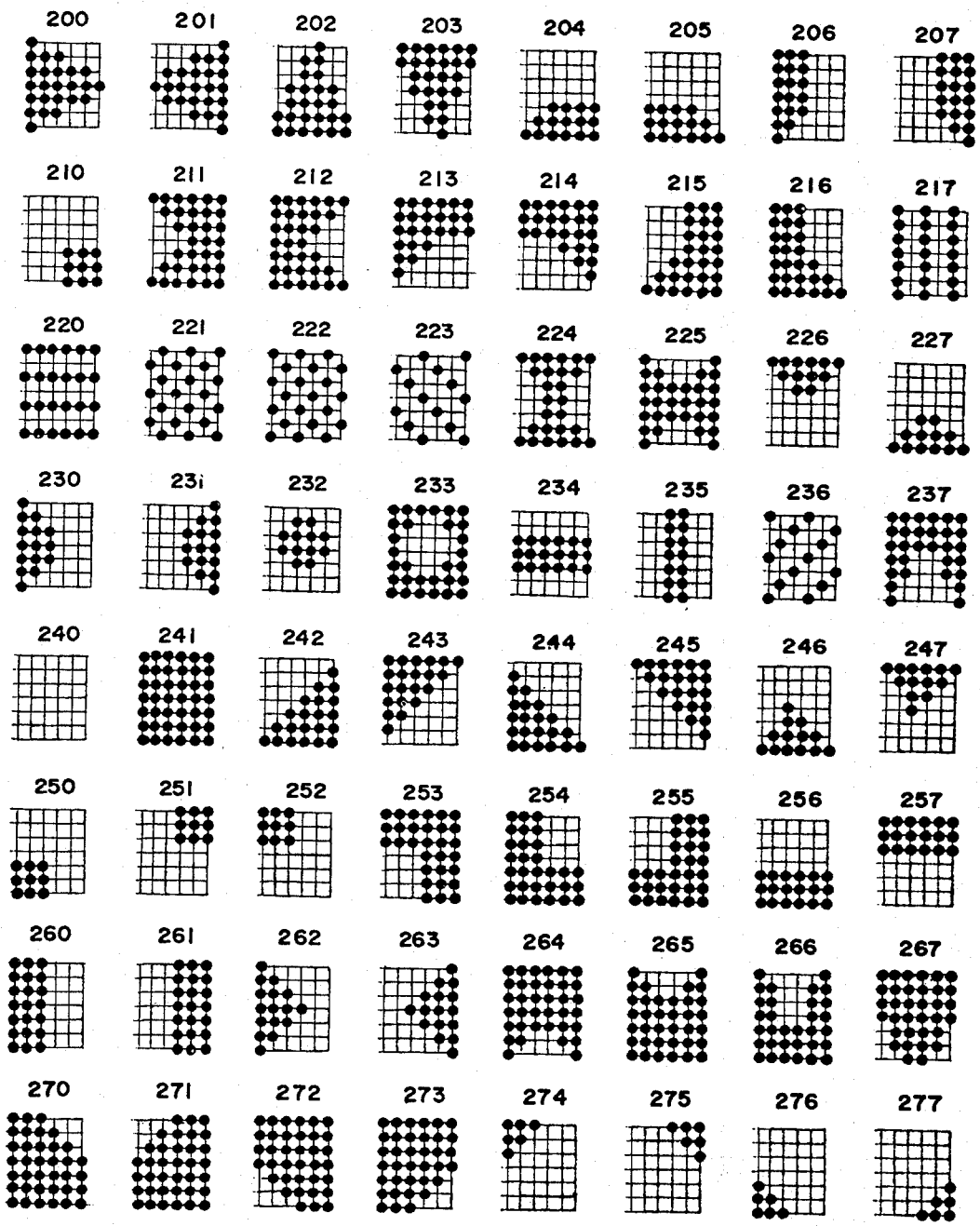
FIG. 3c shows the segmented patterns employed for creating the character and numeral sets of FIGS. 2c and 2d.

A similar technique is employed for printing characters of triple the normal size wherein FIG. 2b shows the alphabetic and numeric characters of triple normal size wherein the segmented patterns employed to form each triple size character are identified by their octal code beneath each triple size character. FIG. 3b shows the 64 segmented patterns employed in the various combinations as shown in FIG. 2b for forming triple size characters. The basic technique may be utilized to print characters of 4, 5, 6 or N times normal size characters with the combination of segmented patterns employed dependent only upon the ingenuity of the user, the novel aspect being the employment of segmented patterns for the purpose of developing graphic patterns of any type. FIG. 3c shows the segmented patterns utilized for generating the character and numeral sets of FIGS. 2c and 2d which are, respectively, four times and seven times the size of the standard character set (i.e., the character and numeral sets of FIGS. 2c and 2d are, respectively, 0.4 inch and 0.7 inch in height).

Whereas the segmented patterns show the manner in which double, triple, four times and seven times standard size characters may be created (see FIGS. 2a-2d respectively) it should be understood that the segmented patterns may be in the form of horizontal, vertical and diagonal lines, for example, which have a capability of being combined to form graphic patterns such as drawing curves, drawing pictures, and the like with the only change being that the read-only memories shown, for example, in FIG. 1a be altered to store segmented patterns suitable for creating graphic representations.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Printing apparatus of the dot matrix type for forming graphic patterns of variable height comprising:
 a paper document;
 first means for selectively printing dots in a linearly aligned array having M dot positions;
 second means for moving said printing means during printing;
 memory means having first and second sets of inputs and being adapted for storing a plurality of data groups each data group representing a segmented dot matrix pattern wherein each segmented pattern comprises N of said linear arrays collectively forming said segmented pattern wherein each data group determines those dots within an M by N dot matrix to be printed; all of said segmented patterns having a uniform height and width;
 register means for storing binary words each representative of the location of a graphic pattern in said memory means;
 the output stage of said register means being coupled to a first set of inputs of said memory means;
 registration means comprising means responsive to movement of said first means and being coupled to the second set of inputs of said memory means for sequentially reading out each of the N linear arrays of the segmented pattern in said memory means represented by the binary word in the output stage of said register means for applying the next code word in said register means to said memory means when the Nth linear array is read out of said storage means;
 third means responsive to the completion of a line of print for advancing the paper document a first distance equal to said uniform height and for clearing said register means preparatory to receipt of the code words identifying the semented patterns for the next line of print whereby the segmented patterns of successive lines collectively form a composite graphic pattern.

2. The apparatus of claim 1 wherein said third means further comprises means for loading a dummy character into said register means upon clearing said register means;
 means for successively loading code words into said register means;
 means coupled to said output stage and responsive to the presence of said dummy character for terminating loading of said register means and initiating the printing operation.

3. The apparatus of claim 1 wherein said memory means comprising a plurality of character generators each being adapted to store a plurality of segmented patterns;
 gating means coupled to said register means output stage and responsive to a selected portion of said binary data for coupling the code word in the output stage to the character generator containing the segmented pattern identified by the code word presently in said output stage.

4. The apparatus of claim 1 wherein said printing means comprises a plurality of slender print wires having linearly aligned impact end;
 energizable solenoids each being coupled to the drive ends of one of said wires;
 means coupling the outputs of said memory means to said solenoids for enabling driving of said print wires.

5. The apparatus of claim 4 further comprising an inked ribbon positioned between said printing means and the paper document and extending along the path of movement of said printing means for forming data at the position impacted by activated print wires.

6. The apparatus of claim 5 wherein said print wire impact ends are vertically aligned so as to form vertical dot column patterns on said paper document wherein N successive dot column patterns collectively define a segmented pattern.

7. The apparatus of claim 3 further comprising an additional character generator containing dot patterns representing standard size alphabetic and number characters and punctuation symbols;

said gating means further comprising means responsive to said selected portion of binary data in each code word for coupling said output stage to said additional character generator for printing standard size dot patterns;

said third means responsive to a request for printing standard size characters for advancing the paper document a second distance which is greater than said first distance.

8. the apparatus of claim 7, wherein said plurality of character segments are formed by at least first and second character generators;

said additional character generator and one of said first and second character generators each being adapted to generate signals representative of a first pattern (N—X) linear arrays for M dots per array wherein the (N—X) arrays are caused to be printed successively within a horizontal space adapted for printing N linear arrays;

the remaining one of said first and second character generators being adapted to generate signals representative of a second pattern of (X) linear arrays adapted to be printed in the remaining horizontal space wherein the X linear arrays of a second pattern and the (N—X) linear arrays of a second pattern are adapted to collectively form a pattern of N linear arrays.

9. The apparatus of claim 8 wherein the signals of one of said first and second generators and said additional generator are adapted to represent a dot pattern formed within a 5 × 7 dot matrix comprised of five linear arrays of seven dots per array.

10. The apparatus of claim 9 where in the signals of the remaining one of said first and second character generators are adapted to represent a single linear array of seven dots.

11. Apparatus for printing normal size, double size and triple size graphic patterns of the dot matrix type on a paper document comprising:

first character generator means for storing dot matrix patterns for normal size graphic patterns, wherein each printable pattern is created within an M row by N column dot matrix where M and N are real integers greater than one;

second character generator means for storing dot matrix patterns for segmented graphic patterns wherein each printable pattern is created within a P-row by Q-column dot matrix wherein P and Q are real integers greater than one;

print means for printing dot columns;

means for moving said print means during printing;

registration means responsive to movement of said print means for generating dot column trigger pulses;

register means for storing a plurality of code words, each word comprising a first group of binary bits for identifying the character generator, a second group of binary bits representative of one of the dot patterns stored in said character generators;

said register means having an output stage;

means responsive to loading said register means for activating said moving means; whereby said trigger pulses are applied to said character generators;

gating means coupled to said output stage and responsive to said second group of binary bits to couple said output stage to the character generator means identified by said second group of binary bits whereby said first group of binary bits selects one of said dot patterns and said trigger pulses sequentially applies each dot column of said pattern to said printing means;

said trigger generator means further comprising means for shifting the next code word in said register means into said output stage upon completion of the last dot column of the selected dot matrix pattern;

means responsive to completion of a line of print for clearing said register means and advancing said paper document a distance equal to the height of a segmented pattern, whereby adjacent lines of segmented patterns cooperatively form a double or triple size graphic pattern.

12. The apparatus of claim 11 wherein said paper document moving means further comprises means responsive to the first group of binary data identifying the printing of standard size characters for advancing said paper document through a distance greater than the height of a standard size character to provide proper spacing between a line of standard size characters and the next adjacent line of printed matter.

13. A method of selectively printing alpha-numeric characters, symbols and the like of M times a "normal" height H on a document comprising the steps of:

a. printing a plurality of segmented patterns along one line of said document each pattern comprising dot positions arranged in a regular matrix of M rows and N columns defining M times N possible dot positions, each such pattern occupying a uniform sized area A of predetermined height H and width W, each area containing a selected pattern of dots located at equi-spaced dot locations, whereby groups of N patterns are printed successively, the width of each group being NW;

b. advancing the document in a direction perpendicular to the direction of printing by a distance equal to the height H upon completion of a line of print;

c. printing a plurality of segmented patterns along the next line of said document whereby the patterns on said next line are positioned immediately beneath an associated group of N patterns printed on the previous line;

d. repeating steps (a) through (c) until M, segmented patterns are printed in the perpendicular direction whereby each completed character is comprised of N times M segmented patterns occupying an area of height MH and width NW;

e. advancing the document through a distance greater than said height H when a line of characters M times the uniform height H is completed in readiness to print the next group of characters.

* * * * *